US010915073B2

(12) United States Patent
Badgwell et al.

(10) Patent No.: US 10,915,073 B2
(45) Date of Patent: Feb. 9, 2021

(54) ADAPTIVE PID CONTROLLER TUNING VIA DEEP REINFORCEMENT LEARNING

(71) Applicant: ExxonMobil Research and Engineering Company, Annandale, NJ (US)

(72) Inventors: Thomas A. Badgwell, Clinton, NJ (US); Kuang-Hung Liu, Basking Ridge, NJ (US); Niranjan A. Subrahmanya, Jersey City, NJ (US); Wei D. Liu, Schenectady, NY (US); Michael H. Kovalski, Summit, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/218,650

(22) Filed: Dec. 13, 2018

(65) Prior Publication Data

US 2019/0187631 A1   Jun. 20, 2019

Related U.S. Application Data

(60) Provisional application No. 62/599,112, filed on Dec. 15, 2017.

(51) Int. Cl.
*G05B 11/42* (2006.01)
*G05B 11/06* (2006.01)
(Continued)

(52) U.S. Cl.
CPC ............ *G05B 11/42* (2013.01); *G05B 11/011* (2013.01); *G05B 11/06* (2013.01); *G06F 17/13* (2013.01);
(Continued)

(58) Field of Classification Search
CPC ....... G05B 11/011; G05B 11/06; G05B 11/42; G05B 13/0265; G06F 17/13; G06N 3/04; G06N 3/08; G06N 3/006; G06N 7/005
(Continued)

(56) References Cited

U.S. PATENT DOCUMENTS 4,754,391 A    6/1988  Suzuki
5,153,807 A *  10/1992 Saito .................... G05B 13/024
                                                      700/37
(Continued)

OTHER PUBLICATIONS

El Hakim, et al; "Application of Reinforcement Learning on Self-Tuning PID Controller for Soccer Robot Multi-Agent System"; 2013 Joint International Conference on Rural Information & Communication Technology and Electric-Vehicle Technology; Nov. 26-28, 2013; pp. 1-6.
(Continued)

*Primary Examiner* — Chun Cao
(74) *Attorney, Agent, or Firm* — Glenn T. Barrett

(57) ABSTRACT

Systems and methods are provided for using a Deep Reinforcement Learning (DRL) agent to provide adaptive tuning of process controllers, such as Proportional-Integral-Derivative (PID) controllers. The agent can monitor process controller performance, and if unsatisfactory, can attempt to improve it by making incremental changes to the tuning parameters for the process controller. The effect of a tuning change can then be observed by the agent and used to update the agent's process controller tuning policy. It has been
(Continued)

unexpectedly discovered that providing adaptive tuning based on incremental changes in tuning parameters, as opposed to making changes independent of current values of the tuning parameters, can provide enhanced or improved control over a controlled variable of a process.

32 Claims, 11 Drawing Sheets

(51) Int. Cl.
*G06N 3/04* (2006.01)
*G06F 17/13* (2006.01)
*G06N 3/08* (2006.01)
*G05B 11/01* (2006.01)
*G06N 3/00* (2006.01)
*G06N 7/00* (2006.01)

(52) U.S. Cl.
CPC .............. *G06N 3/006* (2013.01); *G06N 3/04* (2013.01); *G06N 3/08* (2013.01); *G06N 7/005* (2013.01)

(58) Field of Classification Search
USPC .......................................... 700/29
See application file for complete search history.

(56) References Cited

U.S. PATENT DOCUMENTS

| | | | | |
|---|---|---|---|---|
| 5,223,778 A * | 6/1993 | Svarovsky | ............. | G05B 11/42 318/609 |
| 5,406,474 A * | 4/1995 | Hansen | ................ | G05B 13/045 700/37 |
| 7,184,847 B2 * | 2/2007 | Sun | ...................... | G05B 13/024 700/42 |
| 10,611,026 B1 * | 4/2020 | Sun | ........................ | B25J 9/1661 |
| 2002/0040250 A1 * | 4/2002 | Gaikwad | ................ | G05B 11/42 700/37 |
| 2013/0325764 A1 * | 12/2013 | Morimura | ............. | G06N 20/00 706/14 |
| 2017/0205809 A1 * | 7/2017 | Sayyarrodsari | .... | G05B 19/4155 |
| 2019/0070762 A1 * | 3/2019 | Altonen | ................. | B29C 45/78 |

OTHER PUBLICATIONS

Sedighizadeh, et al; "Adaptive PID Controller Based on Reinforcement Learning for Wind Turbine Control"; World Academy of Science, Engineering and Technology; 2008; vol. 27; pp. 257-262.

* cited by examiner

|  | $\delta \leq 4$ small error | $4 < \delta \leq 8$ med. error | $8 < \delta$ large error |
|---|---|---|---|
| $\lambda \leq \frac{1}{2}N$ | 0<br>100 | 1<br>0 | 2<br>0 |
| $\lambda > \frac{1}{2}N$ | 3<br>0 | 4<br>0 | 5<br>0 |
| $\gamma > 5$ | 6<br>-100 | 7<br>-100 | 8<br>-100 | not oscillating much significant oscillations

Unstable $\lambda = $ number of times error changes sign $\gamma = $ number of consecutive times that MV changes sign while maintaining or growing in magnitude $$\delta = \left(\frac{1}{N}\sum_{i=1}^{N}(y_{sp} - y_i)^2\right)^{\frac{1}{2}}$$

FIG. 2

| Action | | |
|---|---|---|
| 0 | Do nothing | |
| 1 | Increase gain $K_c$ | ← |
| 2 | Decrease gain $K_c$ | → |
| 3 | Increase reset time $\tau_I$ | ← |
| 4 | Decrease reset time $\tau_I$ | → |

Fig. 4

A) If performance is good enough, don't change anything

B) If performance is almost good enough, increase the gain

C) If the loop is unstable, decrease the gain and/or increase the reset time

ADAPTIVE PID CONTROLLER TUNING VIA DEEP REINFORCEMENT LEARNING

CROSS REFERENCE TO RELATED APPLICATION

This application relates and claims priority to US Provisional Patent Application No. 62/599,112, filed on Dec. 15, 2017, entitled "Adaptive PID Controller Tuning Via Deep Reinforcement Learning", the disclosure of which is incorporated herein by reference.

FIELD

Systems and methods are provided for improving process control using proportional-integral-derivative controllers.

BACKGROUND

Processes for separation and refining of crude oil fractions and processes for chemical production can typically involve maintaining control over a variety of variables for a given process. In such processes, process controllers such as proportional-integral-derivative (PID) controllers are often used to allow for automated adjustment of manipulated variables in response to changes in one or more measured or controlled variables. Conventional use of PID controllers can improve process control, but further improvements in maintaining controlled variables at target values are desirable.

The PID algorithm is the default control algorithm for problems with a single measurement and a single actuator. PID controllers can be found in various applications where automatic control is performed. For example, PID controllers can be found in aircraft autopilots, automobile engine control systems, building environmental control systems, drilling rigs, pipeline pressure control, and hard-disk drives. In manufacturing operations, for example in refineries and chemical plants, PID controllers can form the base layer of control, typically sending signals to valves to regulate quantities such as flowrate, temperature, pressure, level, and composition. Above the base layer it is typical to combine PID algorithms with other logic such as sum blocks, split blocks, and select blocks to regulate multivariable systems and to deal with process constraints.

Commercially available PID auto-tuning algorithms typically operate on-demand only, require disturbing the process in some way, and attempt to estimate parameters for an assumed dynamic model form (typically first-order deadtime), from which optimal PID tuning parameters are then calculated. U.S. Pat. No. 4,754,391 is representative of this type of methodology. Unfortunately, assuming a particular process model form limits overall performance when process dynamics evolve to a state that is far from the assumed dynamic model, such as when sensors develop additional deadtime or valves become sticky.

Attempting to manually tune the wide variety of PID controllers in a large manufacturing facility, such as a refinery, can also pose difficulties. For example, a commercial scale refinery can potentially include thousands or even tens of thousands of PID controllers. Trying to manually monitor and tune such a large number of PID controllers can require a substantial amount of resources. Thus, it would be desirable to have improved systems and methods for providing improved automatic tuning of PID controllers, in part to allow the amount of manual intervention to be reduced or minimized.

SUMMARY

In an aspect, a method for controlling a process using a process controller is provided. The method can include performing a process at conditions comprising a value for a controlled variable having a setpoint. The controlled variable can be associated with a process controller comprising a first set of controller tuning parameters, such as a proportional-integral process controller or a proportional-integral-derivative process controller. One or more values of the controlled variable can be detected relative to the setpoint, such as a plurality of values. A first state of the performed process can then be determined based on the one or more detected values of the controlled variable. An action selected based on a comparison of the determined first state with a state-action value function can then be performed. The performed action can correspond to performing an incremental change in a controller tuning parameter from the first set of controller tuning parameters to form a modified set of controller tuning parameters. An example of an incremental change in a controller tuning parameter can be multiplying a controller tuning parameter by a scaling factor. One or more additional values of the controlled variable can then be detected relative to the setpoint after forming the modified set of controller tuning parameters. A second state of the performed process can be determined based on the detected one or more additional values of the controlled variable. Optionally, determining the second state can be further based on one or more of the detected values that were used for determination of the first state. Optionally, determining the second state can be further based on one or more prior determined states. A reward value can then be received based on the determined second state. The state-action value function can then be updated based on the determined first state, the performed action, and the received reward value.

In some aspects, the process controller can be associated with an actuator, an electrical activator, a second controller, and/or another device for controlling a manipulated variable. In such aspects, the method can optionally further comprise modifying the manipulated variable based on the modified set of controller tuning parameters such that the one or more additional values are detected after forming the modified set of controller tuning parameters.

In some aspects, the controller tuning parameters can include one or more of a proportional tuning parameter; a gain parameter; an integral time parameter; an integral tuning parameter; a derivative time parameter; and a derivative tuning parameter. For example, the controller tuning parameters can include at least one of a proportional tuning parameter and a gain parameter, at least one of an integral tuning parameter and an integral time parameter, and optionally at least one of a derivative tuning parameter and a derivative time parameter.

In some aspects, the method can further include updating the state-action value function based on a detected state, a performed action, and a received reward by a second process controller.

In some aspects, determining a state can correspond to determining a state from a plurality of discrete states. In some aspects, determining a state can correspond to determining a state from a continuous distribution of states. Depending on the aspect, the actions can also correspond to discrete actions and/or a continuous distribution of actions. Additionally or alternately, the state-action value function can correspond to a continuous set or function of state-action values, or the state-action value function can correspond to a discrete set of state-action values, or the state-action value function can correspond to a hybrid including one or more continuous portions and one or more discrete portions.

In some aspects, the method can further include identifying an action that cannot be performed. In such aspects, one or more state-action values corresponding to the identified action can be excluded during selection of the performed action based on the comparison of the determined first state with the state-action value function.

In another aspect, a process control system including a first process controller is provided. The system can include a detector for detection of a controlled variable. The system can further include an actuator, electrical activator, second process controller, or combination thereof for modifying a manipulated variable. The system can further include a first process controller comprising a set of controller tuning parameters. The first process controller can be in communication with the detector to receive detected values of the controlled variable. Additionally or alternately, the first process controller can be in communication with the actuator, electrical activator, second process controller, or combination thereof to provide a controller output based on the set of controller tuning parameters for control of the manipulated variable. The first process controller can further include a processor having an associated memory containing executable instructions that, when executed, provide a method according to any of the aspects described above.

In still another aspect, a process controller is provided. The process controller can include a proportional-integral-derivative controller for receiving detected values of a controlled variable and generating a controller output for control of a manipulated variable based on a set of controller tuning parameters. The process controller can further include a state analysis module for determining a state of a process based on one or more detected values of the controlled variable. The process controller can further include a state-action value function module for storing a state-action value function and updating the state-action value function based on rewards associated with at least one determined state and at least one performed action. The process controller can further include a reinforcement learning agent configured to: receive a determined state, select an action based on the stored plurality of state-action values, and perform an incremental modification of at least one tuning parameter of the set of controller tuning parameters. The process controller can further include a reward module for providing rewards to the state-action value function module.

BRIEF DESCRIPTION OF THE DRAWINGS

FIG. 2 shows an example of a reward table for states defined for a first order process.

FIG. 4 shows examples of actions that can be performed for controlling a first order process.

DETAILED DESCRIPTION

Overview

Figure 1:
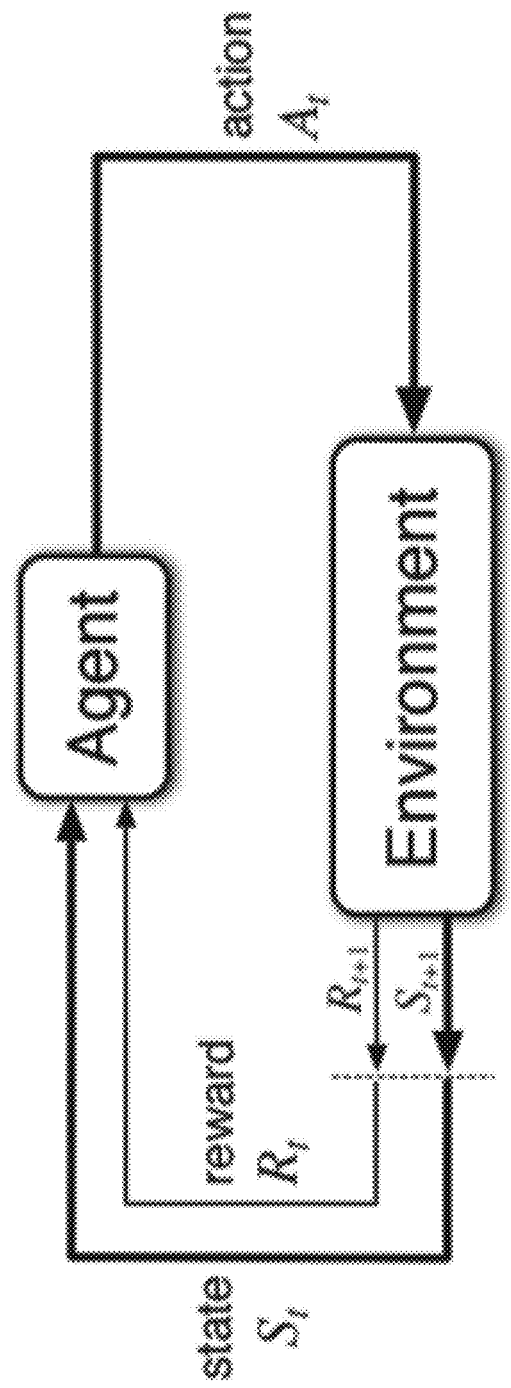
FIG. 1 schematically shows an example of the interaction between a reinforcement learning agent and an environment.

In various aspects, systems and methods are provided for using a Deep Reinforcement Learning (DRL) agent to provide adaptive tuning of process controllers, such as Proportional-Integral-Derivative (PID) controllers. The agent can monitor process controller performance, and if unsatisfactory, can attempt to improve it by making incremental changes to the tuning parameters for the process controller. The effect of a tuning change can then be observed by the agent and used to update the agent's process controller tuning policy. Tuning changes are implemented as incremental changes to the existing tuning parameters so that the tuning policy can generalize more easily to a wide range of PID loops. The implementation of incremental tuning parameters is important to avoid the implementation of over aggressive changes. For example, a sluggish PID control loop with a controller gain of 5.0. After a few experiments a control engineer might learn that increasing the gain to 10.0 provides acceptable closed-loop behavior. The engineer might conclude, incorrectly, that a controller gain of 10.0 is the best value for all PID loops. The correct conclusion, however, is that doubling the controller gain will make any PID loop more aggressive. The implementation of incremental tuning parameter changes will ensure that the learning agent will learn the right lessons.

Processes in a refinery and/or chemical production setting can pose a variety of challenges when using process controllers in an effort to automatically maintain controlled variables at a desired setpoint. In some processes, the challenges can relate to a long lag time between a change in a manipulated variable and the impact on a measured or controlled variable. For example, for a polymer synthesis reaction system or a hydroprocessing reactor, the volume of the reactor can be substantial relative to the rate of fluid flow into and out of the reactor. For these types of reactors, if a controlled variable such as temperature diverges from a desired setpoint, the relatively large volume of the reactor may make it difficult for a change in a manipulated variable to have a short term impact in causing the controlled variable to converge toward the setpoint. Instead, the controlled variable may continue to diverge for a period of time, even though a suitable change in the corresponding manipulated variable has already been made. This lag between change in manipulated variable and detection of a response in the measured or controlled variable can lead to overcorrection. When overcorrection occurs, a controlled variable that is greater than/less than a setpoint value can be corrected to the point where it diverges from the setpoint by being less than/greater than the setpoint value. In some situations, overcorrection can occur repeatedly, leading to unstable operation with large swings of the controlled variable around the desired setpoint. Alternatively, setting the tuning parameters for a controller to avoid overcorrection can result in controlled variables remaining unacceptably far from setpoint for extended periods of time. Developing a model for adjusting PID tuning parameters that accounts for all of the potential situations that may arise is a difficult challenge.

In various aspects, instead of constructing a fixed model as the basis for adjusting PID controller tuning parameters, a reinforcement learning agent can be used to adjust PID controller tuning parameters without requiring an explicit model. In such aspects, the agent can adjust the tuning parameters based on rewards received in response to performing actions based on various states of a controlled variable.

Proportional-Integral-Derivative (PID) controllers are commonly used as process controllers for modifying a manipulated variable in response to a controlled variable. In this discussion, it is understood that references to a PID controller also include proportional-integral (PI) controllers that operate using only a proportional term and an integral term. Such process controllers can be dedicated PI controllers and/or or PID controllers where the coefficient for the derivative term is set so that the derivative provides no contribution/a minimized contribution to the controller.

While there are many versions of the PID control algorithm, the following discrete-time form shown in Equations (1) through (4) is representative.

$$u_k = K_c \left[ e_k + \left(\frac{\Delta t}{\tau_I}\right) \sum_{j=0}^{\infty} e_{k-j} + \left(\frac{\tau_D}{\Delta t}\right)(e_k - e_{k-1}) \right] \quad (1)$$

$$e_k = r_k - y_k \quad (2)$$

$$r_k = r_{k-1} + \alpha(y_{sp} - r_{k-1}) \quad (3)$$

$$\alpha = (1 - \exp(-\Delta t/t_c)) \quad (4)$$

These equations describe the PID computation at time interval k, with the understanding that it executes at succeeding intervals in time separated by a constant control interval (k, k+1, k+2, etc.). Table 1 describes the variables represented in Equations (1) through (4). The text in parentheses describes how the variables can be applied when operating a flow controller.

TABLE 1

Variables in Equations (1) through (4)

| | |
|---|---|
| $y_{sp}$ = | setpoint for controlled variable (flowrate setpoint) |
| $y_k$ = | current value of controlled variable (measured flowrate) |
| $e_k$ = | controlled variable error (reference value minus measurement) |
| $r_k$ = | reference value |
| $\alpha$ = | reference trajectory filter factor |
| $t_c$ = | closed-loop time constant |
| $\Delta t$ = | control interval |
| $K_c$ = | control gain |
| $\tau_I$ = | integral time |
| $\tau_D$ = | derivative time |
| $u_k$ = | manipulated variable (valve position) |

In Equations (1) through (4), a controlled variable refers to a variable that is measured by the PID controller in order to keep the variable near a reference value or reference trajectory. The reference value in turn tracks a setpoint value through a first order filter. This arrangement effectively allows the user to speed up or slow down the closed-loop response by specifying the desired closed-loop time constant. When the closed-loop time constant is near zero the PID algorithm will keep the controlled variable close to the setpoint value. When the closed-loop time constant is large, the PID algorithm will bring the controlled variable slowly up to the setpoint value. A manipulated variable refers to the actuator or other physical device that the PID directly manipulates. As an example, a PID controller can be used to operate a flow controller. In such an example, the controlled variable can correspond to a flowrate. The PID can attempt to control the flowrate relative to a target or setpoint corresponding to the desired flowrate (i.e., the flowrate setpoint). In order to control the flowrate, measurements of the flowrate can be taken, which correspond to the current value of the controlled variable at a given time. The error in the controlled variable would correspond to the difference between the measured value of the flowrate and the reference value. In order to control the flowrate, the PID can change the position of a valve so that the valve is more open or more closed. The PID control algorithm executes at distinct points in time separated by a constant user-defined control interval. The control gain, integral time, and derivative time are tunable parameters that can be used to modify how the PID controller responds to differences between the measured flowrate and the setpoint for the flowrate.

More generally, the PID controller operates on a process, and it is the process that determines how the controlled variable y moves as the manipulated variable u is adjusted. The overall performance of a PID controller operating on a particular process is determined by the values of the tuning parameters $K_c$, $\tau_1$, and $\tau_D$. In some aspects, the control gain $K_c$ can have increased importance, as the control gain $K_c$ determines the aggressiveness of the control action (large magnitude for aggressive control, small magnitude for passive control). It is noted that other functional forms can be used, but typically other functional forms can also include tuning parameters that include a proportional tuning parameter, an integral tuning parameter, and a derivative tuning parameter. In Equation (1) the proportional tuning parameter corresponds to $K_c$, although it is understood that other functional forms could include another parameter prior to the first term in the brackets, so that the proportional tuning parameter could be based on a combination of $K_c$ and the additional parameter. In Equation (1) the integral tuning parameter can be viewed as either as $\tau_1$ or as $K_c/\tau_1$. Similarly, depending on a desired method of control, in Equation (1) the derivative tuning parameter can be viewed as either $\tau_D$ or as $K_c*\tau_D$.

It is important to note that the best values of the tuning parameters $K_c$, $\tau_1$, and $\tau_D$ will be different for each process that the PID controller operates on. The tuning parameters can be determined through a workflow that is commonly referred to as "tuning" the controller. It is also important to note that when choosing the tuning parameters for a particular process, there is a tradeoff between control performance (how well the controller keeps the controlled variable at its setpoint) and control robustness (how much process variation that can be tolerated before the controller becomes unstable). If the controller is tuned aggressively it will perform well, but will not be able to tolerate as much variation in the process. Likewise, a controller that is de-tuned so that it can tolerate a wide variation in process conditions will not perform as well for any particular process condition.

Reinforcement Learning can be defined as a branch of Machine Learning concerned with learning by interacting with the environment. The interaction between an Agent and the Environment is abstracted as shown in FIG. 1. At each time step t the Agent receives from the Environment a reward $R_t$ and a state measurement $S_t$. The Agent then injects an action $A_t$ into the Environment with the goal of maximizing some notion of a cumulative future reward ($R_{t+1}+R_{t+2}+R_{t+3}$ . . . ). This cumulative future reward can be referred to as the value, or the state-action value. The Environment is assumed to be a dynamic system that propagates forward in time as a Markov process defined by an unknown state transition probability: $p(S_t|S_{t-1}, A_{t-1})$. Reinforcement Learning has evolved as an effective tool for solving many problems, but often requires significant engineering effort and domain knowledge to define an appropriate set of states, rewards, and actions for a particular application. The application-specific engineering effort to exploit domain knowledge is sometimes referred to as "feature engineering".

In various aspects, creating a reinforcement learning agent for a PID controller tuning problem can include defining appropriate states, rewards, and actions; specifying a structure for the neural networks used for function approximation; and choosing a particular reinforcement learning algorithm. Examples of reinforcement learning agents include, but are not limited to, actor-critic agents and state-action-reward-state-action agents (or SARSA agents).

For PID controllers, suitable states for use by a reinforcement learning agent can include states based on one or more measurements of a controlled variable relative to the setpoint, and may often correspond to states based on a plurality of measurements of a controlled variable relative to a setpoint. Examples of possible states can include states related to the size of error relative to the setpoint; states related to convergence or divergence from the setpoint; states related to first order oscillation around a setpoint, and states related to longer time scale oscillation around a setpoint. In some aspects, one or more prior states and/or prior values used to determine prior states can be used as part of the determination of a current state. An example of a possible state can be a second order oscillation state that is determined based on performing a discrete Fourier transform on the controlled variable values over a defined time period. States can be defined as discrete states or continuous states, depending in part on the type of agent used. For example, continuous states can be defined for use with agents designed to interface with continuous states, such as an actor-critic agent. For continuous states and/or actions it is necessary to approximate the value function in some way. Neural networks are often used for value function approximation. In some aspects, deep neural networks with many internal layers can be used to approximate the value function. In such aspects, raw controlled and raw manipulated variable signals/values can be used for the states, which can reduce or minimize the feature engineering required for a particular application. It is noted that while the above examples of definitions for states involve measurements of only a single variable to determine the state, such as temperature, in some aspects it could be desirable to develop state definitions that involve more than one type of measured value when determining a state, such as using both one or more temperature values and one or more flowrate values to determine a state.

As a further illustration of potential types of states that can be identified for use in managing a PID controller, one option can be to define a low dimensional space of discrete states and actions. A SARSA algorithm is an example of an agent that can be used for this type of discrete state and action definition. As an example of discrete states, a plurality of states can be chosen to characterize features of control performance. For a PID controller (or optionally a PI controller operated based on just the proportional and integral terms), two features of interest are the amount of error (i.e., difference between controlled variable and setpoint) and oscillations in the error. To characterize these features in terms of states, a first state can correspond to error standard deviation. The error standard deviation can characterize how far, on average, the controlled variable is from the setpoint. A second state can correspond to the number of error sign changes during a time period. The number of error sign changes is a way to characterize the degree to which the controlled variable is oscillating. A third state can correspond to an oscillation index. The oscillation index can be used for second order deadtime process tests, because second order processes under PID control can oscillate in a fundamentally different way from first order processes. The oscillation index can be calculated from the discrete Fourier transform of the error signal over an evaluation period. In other aspects, a continuous set of states can be developed for use with other types of agents, such as an Actor-Critic algorithm.

Based on these state definitions, a plurality of rewards can be developed that correspond to the reward for ending an evaluation period in a given state and/or a plurality of states. In the low dimensional space example described above, the rewards can be based on a combination of the error standard deviation and values for one or both of the oscillation states. Any convenient reward strategy can be used. An example of a reward strategy can be to assign a reward of +100 when the system is in a target or desired state. The target or desired state can correspond to, for example, having a small error standard deviation and an amount of oscillation (either first order or second order) that is below pre-defined threshold(s). States where unstable oscillations are occurring can be assigned a reward of −100. Other states can be assigned any convenient value. One option is to assign all other states a reward of 0. Another option can be to evaluate whether any states are likely to indicate a transition to the desired state and/or a transition to an unstable state. Based on that evaluation, rewards other than 0 can be assigned to those states. For example, it is noted that it may not necessarily be helpful to assign negative reward levels to states that are near to an unstable oscillation. When curing an unstable oscillation, it is likely that the controlled variable may pass through a nearby state while heading toward the desired or target state. It can be beneficial to have the rewards structured so that the agent is not penalized for passing through states that are near unstable oscillation when the controlled variable is recovering from unstable operation.

Based on determining a current state, the agent can select an action to perform. The action can be selected based on the value function estimated from various actions performed when in a state corresponding to the current state. This value function is referred to herein as a state-action value function. For a discrete-state, discrete-action example, the state-action value function can be stored as and/or can correspond to a plurality of discrete state-action values in a state-action value table. It is understood that an implicit assumption behind the state-action value function is that the selection of future actions will also be based on use of the state-action value function. In various aspects, because the agent is tuning a PID controller, the actions selected by the agent can correspond to various types of changes in the tuning parameters for the PID controller. Examples of possible actions can include changing the sign and/or the magnitude of the controller gain parameter and/or changing the controller linear-response parameter; changing the magnitude of the controller integral time parameter and/or the integral tuning parameter; or changing the magnitude of the controller derivative time parameter and/or the derivative tuning parameter.

In various aspects, the action selected by the reinforcement learning agent can correspond to making an incremental change in the value of a parameter. Instead of attempting to define actions based on absolute values for tuning parameters, the actions can instead correspond to changes in parameter values based on the current value of the parameter. This allows the tuning policy learned for one loop to be applicable to many others. An example of an incremental change can correspond to multiplying a current parameter value by a scaling factor. This can be referred to as a scaled incremental change. For example, a possible action could be to increase or decrease the gain parameter by a factor of 0.5 (or another scaling factor) relative to the current value. Optionally, multiple actions can be available corresponding to use of different scaling factors for modifying a parameter. Optionally, an action can correspond to a variable scaling factor, such as a scaling factor that is dependent on the controlled variable error (i.e., the difference between the controlled value and the setpoint). Another example of an incremental change can correspond to adding or subtracting a factor from the current value of a tuning parameter. In aspects where continuous states and/or actions are defined, the incremental changes can correspond to a continuous set of possible incremental parameter changes (including combinations of parameter changes).

When selecting an action based on the current state, or possibly based on a recent number of states within a time period, a reinforcement learning agent can a select an action based on the state-action value function. In a discrete implementation, the state-action value function can be represented by a plurality of state-action values. In a continuous implementation, the plurality of state-action values can correspond to the continuous set of state-action values that can be determined based on the state-action value function. The state-action value function and/or the state-action values correspond to a function/values accumulated by the agent based on rewards from past actions. When a reward is received, the state-action value function (such as the discrete table of state-action values) can be updated based on the received reward. In some aspects, the state-action values can correspond to a discrete table of combinations of past states and future actions. Optionally, at least some past states can correspond to a plurality of past states, such as a sequence of past states. Optionally, some future actions can correspond to a plurality of actions, such as a sequence of future actions.

In various aspects, any convenient type of reward system can be used for the reinforcement learning agent. Examples of suitable rewards can correspond to point values based on a future outcome after performing a selected action, where the future outcome corresponds to the resulting state at a later time. Depending on the aspect, the number of states and/or actions performed prior to assigning a reward can vary. Depending on the aspect, the amount of time to wait prior to determining the state resulting from an action (or a plurality of actions) can vary.

In some aspects, an alternative process can be used to select an action for certain states. As an example, if a state is detected where the controlled variable is oscillating in an undesirable manner, an action corresponding to reducing the gain parameter by a scaling factor can be used as an automatic action for that circumstance. Optionally, this type of automatic action can be performed prior to the normal end time for an evaluation time period for determining an action.

After the oscillation state is corrected, the normal process of selecting actions based on state-action values can be used. Any convenient number of states can be defined that have a corresponding pre-assigned action.

In some aspects, prior to selection of an action based on a state-action value function, one or more actions can be identified as not available for selection. This can correspond to a situation where the one or more actions cannot be performed by the PID controller. For example, if the integral time parameter (sometimes referred to as the reset time) is already set at a maximum permitted value for the PID controller, actions from the state-action value function corresponding to an increase in the integral time parameter can be identified. Based on this identification, the agent can make a selection based on only the values in the state-action value function that are not identified. This can avoid difficulties with the learning process where an action might be selected by the agent, but then the action cannot be performed, leading to incorrect assignment of a subsequent reward for an action that did not actually occur. The identified action(s) can be made available for selection again when it is determined that performing the action is allowable. For the example above, if the integral time or reset time parameter is subsequently decreased by a sufficient amount of allow an increase in the integral time parameter to be successfully performed, the previously identified actions corresponding to an increase in the integral time parameter can be made available for selection by the agent.

During operation of a PID controller, a reinforcement learning agent can determine a current state and modify the PID tuning parameters on any convenient schedule. As an example of a possible schedule, the controlled variable for a PID controller may be sampled at a rate, such as three times per second. The PID controller can potentially make changes to the manipulated variable at the same rate (three times per second) or at a different rate, such as a slower rate. The reinforcement learning agent can accumulate data over a plurality of controlled variable values and/or manipulated variable values in order to determine the state. For example, the reinforcement learning agent can determine the state after every 100 measurements of the controlled variable, or every 200 measurements, or every 500 measurements, or based on any other convenient fixed or variable number of measurements. Additionally or alternately, the determination of the state can be based on a desired number of samplings of the manipulated variable and/or based on an elapsed period of time and/or based on any other convenient metric. After determining the state, an action can be determined based on the state-action value function (such as looking up a value in a state-action value table in a discrete implementation). An additional number of measurements of the controlled variable/manipulated variable/other metric can then be accumulated prior to the next determination of the state.

Operating a PID controller using a reinforcement learning agent can potentially provide a variety of advantages. For example, by using states and actions as the basis for determining how to control a process, an explicit model of how the process works is not required. Thus, the agent can be adaptable when the nature of the process changes, such as when the setpoint is changed. The agent can also adapt to imperfections in system operation, such as when a valve "sticks" and becomes less responsive when moved. Additionally or alternately, the agent can run continuously, as opposed to attempting to change parameters only when requested. This can allow the agent to respond to unexpected process upsets and/or other unplanned process changes.

Further additionally or alternatively, the agent does not need to introduce intentional process disturbances in order to learn.

Still another potential advantage can be the ability of multiple PID controllers to share learning. In part because the PID controllers are performing relative or incremental changes to tuning parameters, reward data gathered by PID controllers managing similar types of processes can be aggregated, even though each individual process may operate differently due to other environmental factors surrounding the individual processes.

Example of Controller Configuration

Figure 3:
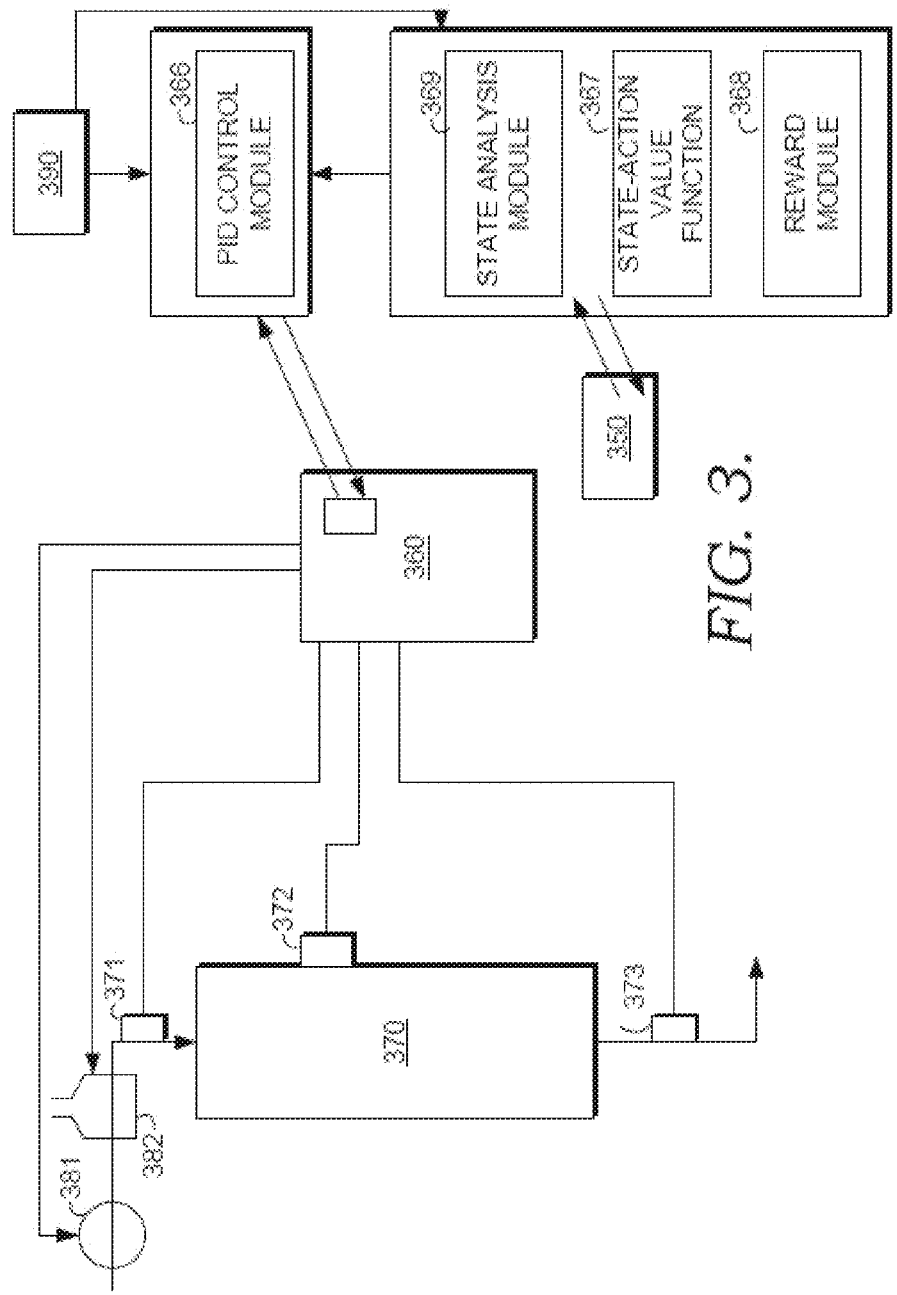
FIG. 3 shows an example of a system configuration for a process controlled by a PID controller.

FIG. 3 schematically shows an example of process controller configuration for implementing a reinforcement learning agent as part of the process controller configuration. In FIG. 3, a controller 360 is part of an overall control system for a reactor 370 including at least one source of controller input (corresponding to a controlled variable) and at least one device for receiving controller output (for controlling a manipulated variable). In FIG. 3, multiple examples of sources of controller input and devices for receiving controller output are shown as being related to a single controller, but this is for convenience in illustrating potential applications of a process controller. In practice, a process controller can often be configured to receive a single controller input based on a controlled variable and to generate a single controller output for controlling a manipulated variable. Examples of detectors to provide a source of controller input based on a corresponding controlled variable can include, but are not limited to, a thermocouple, thermometer, or other temperature detector 371, a pressure detector 372, or a detector for product characterization 373. A detector for product characterization can correspond to any convenient type of method for characterizing an effluent from a reactor, such as a viscometer, a mass spectrometer, a spectrometer for characterizing electromagnetic radiation (i.e., IR spectrometer, UV/VIS spectrometer), a sulfur detector, or another convenient type of product characterization. A device for receiving controller output can correspond to an actuator, an electrical activator, or another process controller. In this latter situation, a first process controller can provide an output that can be used as the setpoint for a second process controller. An input actuator can correspond to, for example, an actuator 381 associated with a valve to change the valve position. An input electrical activator can correspond to a controller for changing the operation of device that does not necessarily require physical motion to be changed. For example, an electrical activator 382 can change the duty cycle of a heater and/or change a temperature setpoint for a heater.

During operation, process controller 360 can receive controller input from a detector (or from a plurality of detectors) 371, 372, or 373, or alternatively from another process controller. This controller input can be processed to determine the current value of a controlled variable and to provide an appropriate controller output for control of a device corresponding to a manipulated variable, such as an output signal for an actuator 381 (such as for controlling a valve position) or an output signal for an electrical activator 382 (such as for controlling a duty cycle of a heater). The controller input from a detector (or optionally from another process controller) can be processed using a proportional-integral-derivative (PID) control module 366 to generate the appropriate controller output. Optionally, the proportional-integral control module 366 can be operated as a proportional-integral control module.

In FIG. 3, the controller input from one or more of detectors 371, 372, or 373 can also be used by a learning agent 350 to modify the tuning parameters for the PID control module 366. For example, the controller input from the one or more of detectors 371, 372, or 373 can be used by state analysis module 369 to determine one or more states that are associated with the current value of the controlled variable and/or the value of the controlled variable over a period of time. Based on the state determined by the state analysis module 369, the learning agent 350 can select an action to perform based on a stored state-action value function 367. The state-action value function can correspond to a plurality of discrete state-action values, a continuous set of state-action values, or a combination thereof. Based on the selected action, the tuning parameters in control module 366 can be modified, such as by making an incremental change in one or more of the tuning parameters. The modified set of tuning parameters for the proportional, integral, (and optional derivative) terms can then be used by proportional-integral control module 366 for determining the controller output signal to actuator 381 and/or electrical activator 382. At a later point, after one or more additional evaluations of the state by state analysis module 369, a reward can be determined by reward module 368 that corresponds to the combination of state and action that was selected.

In addition to the above, the proportional-integral control module 366 can also receive changes to the setpoint for a controlled variable, such as from a setpoint modification module 390. Setpoint modification module 390 can also provide setpoint changes to state analysis module 369. Alternatively, changes to the setpoint can be provided from various other types of components, such as an input provided by a process controller associated with another controlled variable. It is noted that the various components associated with learning agent 350 can be grouped or located in any convenient manner. For example, state analysis module 369, state-action values 367, and rewards module 368 can be co-located with proportional-integral control module 366 if desired.

The learning agent and modules shown in FIG. 3 can optionally be implemented as modules that run by executing computer-executable instructions that are in memory associated with a processor. The processor can be part of the controller and/or associated with the controller. Such computer-executable instructions can be stored using computer-readable media. Computer-readable media can be any available media that can be accessed by a processor (or other computing device) and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. In some aspects, computer storage media corresponds to tangible computer storage media. In some aspects, computer storage media corresponds to non-transitory computer storage media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory can include computer storage media in the form of volatile and/or nonvolatile memory. The memory may be removable, non-removable, or a combination thereof. Exemplary memory includes solid-state memory, hard drives, optical-disc drives, and other conventional forms of memory.

Example—RL Tuning of a PI Controller for a First Order Process

The following provides an example based on a simulated processing environment. In the simulated processing environment, a reinforcement learning agent was used to tune a simulated PI controller for a simulated first order process. The simulated first order process corresponded to a fired heater, where the controlled variable was the fired heater outlet temperature and the manipulated variable was a valve for adjusting the fuel gas flowrate. In this example, a small number of discrete states and actions were used. FIG. 2 illustrates how states and rewards were defined for this example. The nine states lie in a matrix, with the columns defined by three ranges of the error standard deviation and the rows defined by two ranges of a controlled variable oscillation metric and one range of a manipulated variable oscillation metric. The states are indexed as 0 through 8. As shown in FIG. 2, when the error was small and the process was not oscillating then the process was in state 0, the best possible state, and a reward of 100 was returned. If the process was oscillating significantly and/or the error was significant, a reward of 0 was returned. Finally, if the process was unstable a reward of −100 is returned.

FIG. 4 summarizes the actions defined for this example. Action 0 was to do nothing, and would be expected when the process is in state 0. The other four actions correspond to proportional changes in the tuning factors. In FIG. 4, "increase" means multiply the indicated tuning parameter by a factor 1.5, while "decrease" means multiply the corresponding tuning parameter by a factor of 0.667. Because the controller was operated in proportional-integral mode, the derivative term in the controller was not used and therefore was not modified.

Figure 5:
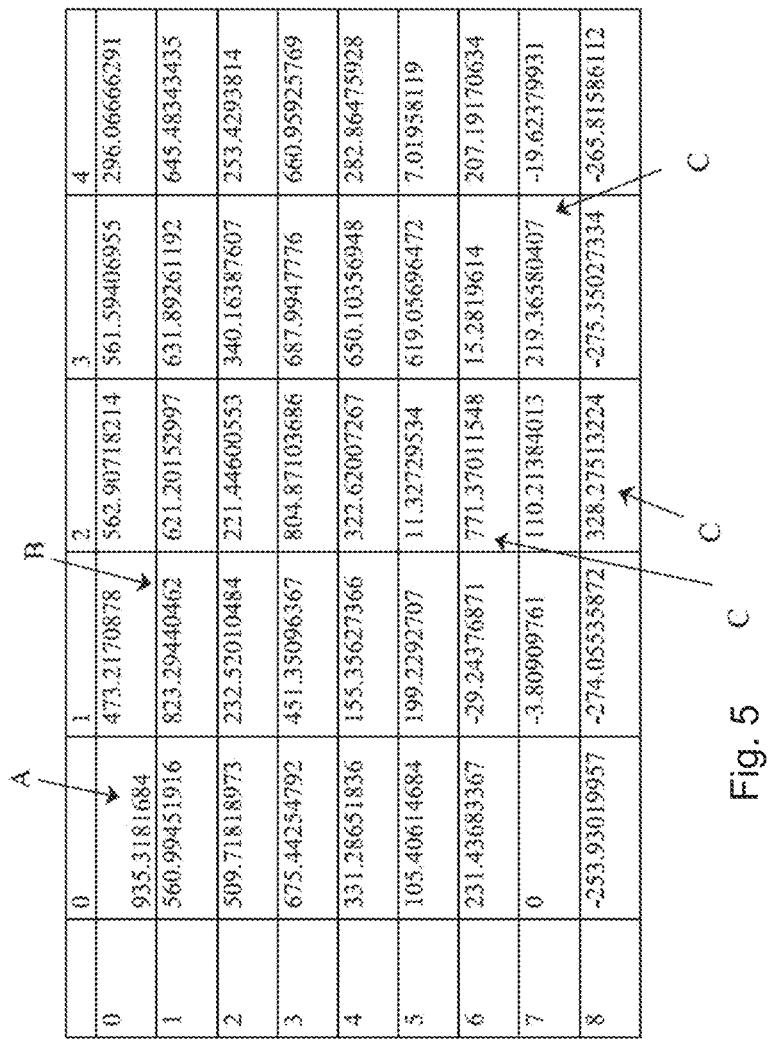
FIG. 5 shows an example of a table of state-action values that were determined by operating a PI controller to control a first order process based on the states, actions, and rewards shown in FIG. 2 and FIG. 4.

FIG. 5 illustrates the state-action value function table Q(s,a) that the agent learned by running overnight for several thousand iterations. Each state-action value q_ij in the table (the value for row i and column j) is an estimate of the long term value of being in state i and taking action j. In real-time operation, the agent looked in row i corresponding to the current determined state to identify the column j with the highest value q_ij. The agent then output the action j. For example, the agent learned that when it is in state 0, the most valuable thing to do was to take action 0, which corresponds to doing nothing. It also learned that when it is in state 1, the most valuable thing to do was to increase the controller gain K_c. And finally, the agent learned that when the system was in an unstable state (6, 7, or 8), the most valuable thing to do was to either increase the reset time τ_I or decrease the controller gain K_c. It is noted that in some other configurations, rather than having the agent learn how to respond to an unstable state, it could be desirable to automatically select an action such as decreasing the controller gain.

Example: DRL PID Tuning for a More Complex Processes

Figure 6:
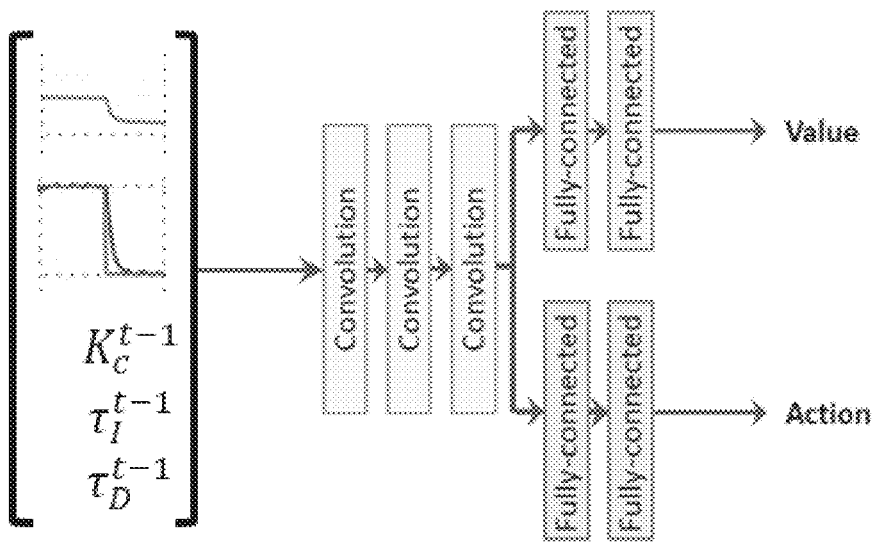
FIG. 6 shows a Deep Reinforcement Learning (DRL) agent for use on more complex PID tuning problems with continuous states and actions.

As more complex processes are considered it is no longer practical to use discrete states and actions for the PID tuning agent. For these cases it is necessary to use continuous states and actions, requiring that some form of function approximation be used for the state-action value function. In this example we use a neural network architecture known as Deep Reinforcement Learning. The neural network provides a convenient method for the function approximation, and the deep architecture extracts relevant features from the raw data automatically, eliminating the need for feature engineering. The use of Deep Neural Networks with Reinforcement Learning is known as Deep Reinforcement Learning or DRL. FIG. 6 illustrates the continuous states and actions for a DRL agent that has been tested on a number of different simulated complex processes. The reward function for this case is the negative of the sum of the squared controlled variable error over the most recent evaluation interval. The state vector is composed of continuous variable sequences taken from the most recent evaluation interval. First is the manipulated variable sequence, next is the controlled variable sequence, and last is the setpoint variable sequence. To this is appended the previous values of the three PID tuning parameters. The action is a vector of multiplication factors used to modify each of the three PID tuning parameters. As illustrated in FIG. 6, the DRL agent neural network architecture may contain different network cells that may, for example, contain three convolutional layers followed by two separate fully connected layers (i.e., every input node is connected to an output note in the connected layers) used to calculate the value function and the policy function or action function. The shared convolutional layers provide common information related to both the value function and policy functions, which improves the speed at which the functions are learned. Other network architectures are possible. For example, one may use recurrent layers rather than the convolutional layers. The policy network calculates the next action, and the value function network calculates the value of the next action.

Figure 7:
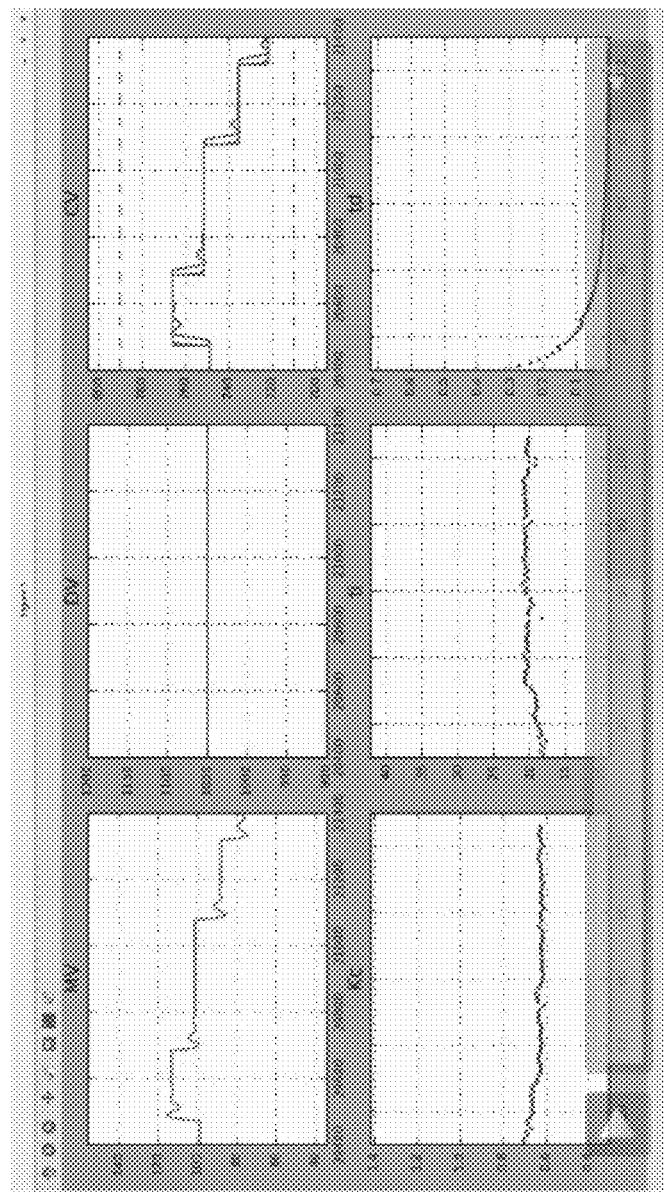
FIG. 7 shows the response of a DRL agent tuning a PID controller on a $2^{nd}$ order process with continuous states and actions.

FIG. 7 shows the response of a trained DRL PID tuning agent on a 2nd order process with deadtime. The plots on the top row show how the Manipulated Variable (MV) and Controlled Variable (CV) respond to a series of setpoint changes. The middle plot on the top row shows a Disturbance Variable (DV) that was not used in this simulation. The plots on the bottom row show how the three PID tuning parameters respond as the agent does the tuning.

Example: Master DRL PID Tuning Agent for Five Distinct Process Types

Figure 8:
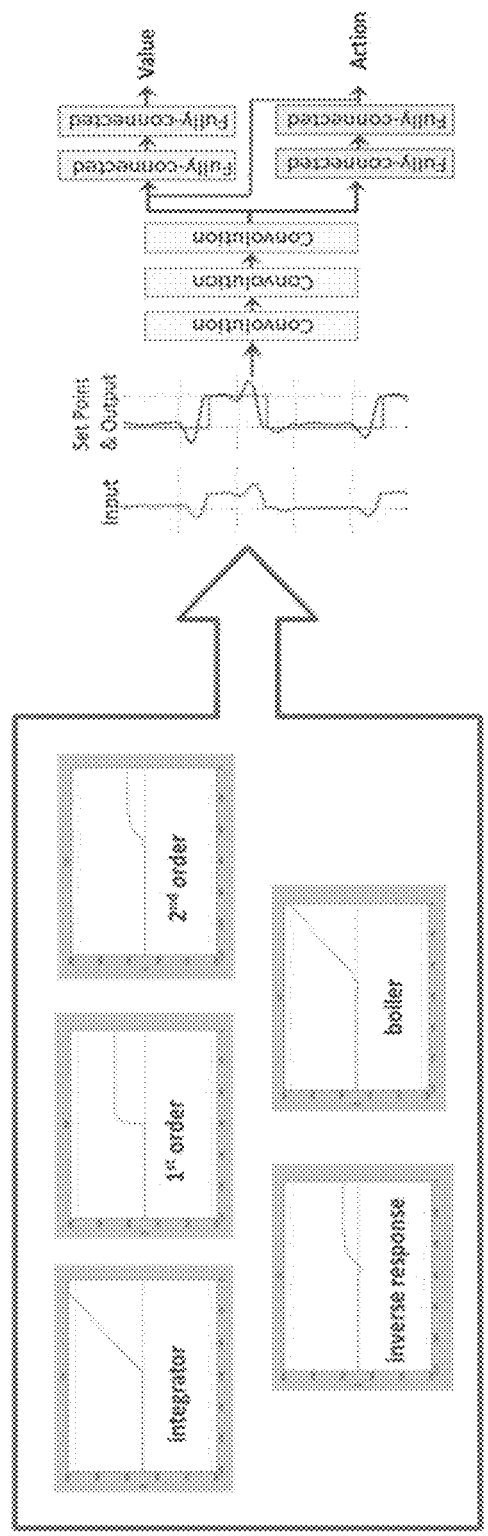
FIG. 8 shows the five types of dynamic processes that were used to train a Master DRL agent capable of tuning a PID controller for any of the five types of dynamic processes.
Figure 9:
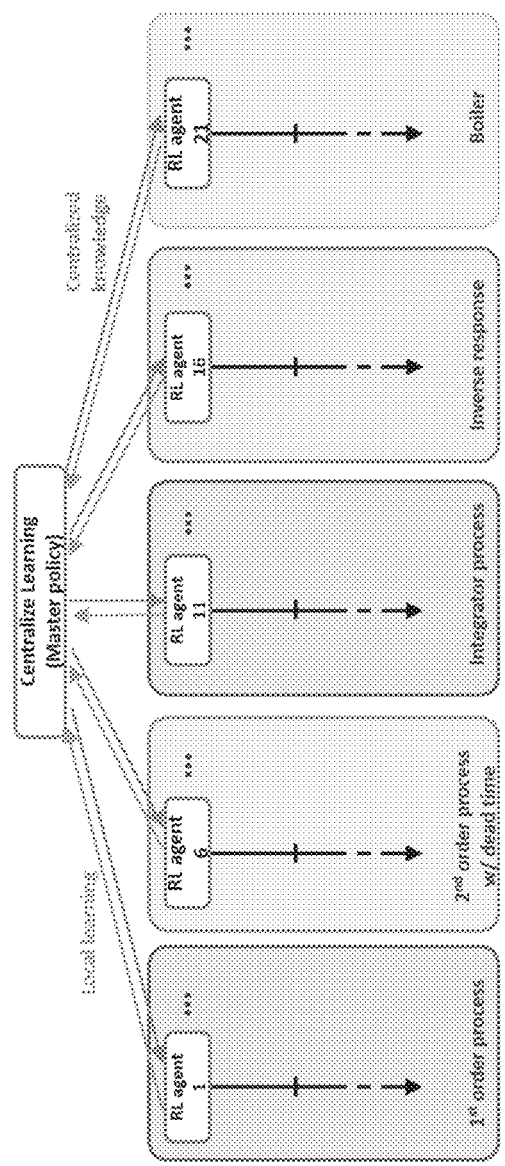
FIG. 9 shows the parallel learning architecture used to train the Master DRL PID tuning agent on five types of process dynamics.

A Master DRL PID tuning agent can be trained to tune a number of distinct PID control loops, rather than training separate DRL PID tuning agents for each one. To test this idea a Master agent was trained on five different PID control loops, with process dynamics illustrated in FIG. 8. FIG. 9 illustrates a parallel architecture used to train the Master DRL PID tuning agent. In this case twenty five individual agents ran simultaneously, five of each process type, and each on a separate node of a high performance computing cluster. Each agent periodically reported policy update information, in the form of a local policy gradient, to the Master node, where the gradients were applied to update the Master agent's policy. This arrangement, similar to that in [V. Mnih et al., Asynchronous Methods for Deep Reinforcement Learning, Proceedings of the $33^{rd}$ International Conference on Machine Learning, New York, N.Y., (2016)], significantly speeds up learning while also allows for development of a robust Master agent capable of tuning PID control loops with a wide range of closed-loop dynamics.

Example: Master DRL PID Tuning Agent for Interacting Control Loops

Figure 10:
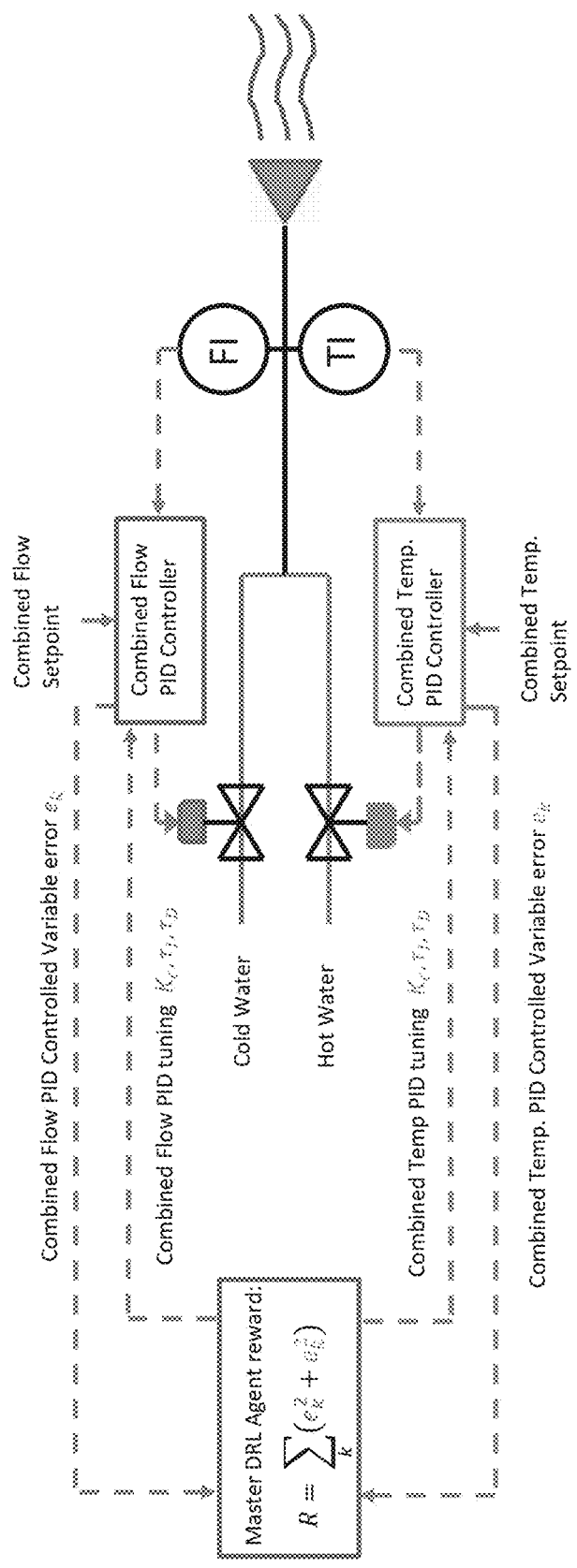
FIG. 10 shows two interacting PID controllers in accordance with the presently disclosed subject matter.

In some cases it is necessary to simultaneously tune two or more PID control loops that affect each other dynamically. Consider, for example, a system composed of two pipes, one supplying hot water and the other supplying cold water, that combine and flow to a showerhead, as shown in FIG. 10. Assume that there are two PID controllers—one that controls the combined flowrate by adjusting the cold flow valve, and one that controls the combined temperature by adjusting the hot flow valve. It is expected, for this configuration, that the two PID controllers will interact dynamically. If, for example, one increases the combined flowrate setpoint, the combined flow PID controller will open the cold flow valve to increase the combined flowrate. This will subsequently reduce the combined PID controller, causing the combined temperature flowrate to open up the hot flow valve. This of course increases the combined flowrate, causing the combined flowrate PID controller to have to adjust the cold flow valve again. These PID controllers will continue to fight each other until the system eventually comes to a steady state. For this system it will be important to tune the PID controllers simultaneously so as to achieve an acceptable speed of response without too much interaction. A different design for the master DRL PID tuning agent is used, in which the reward function consists of a negative of the sum of the squared controlled variable errors for both PID controllers over the most recent evaluation period, as shown in FIG. 10. A single or shared DRL PID learning agent is utilized to adjust the operation of both PID controllers. Each PID controller may utilize a PID control algorithm as described in above in connection with FIG. 1. In this configuration, the agents are combined into a single learning agent that interacts with the environments associated with each of the PID controllers. The common learning agent creates actions for the PID controllers based upon learnings from each of the environments associated with each of the PID controllers. Creating a reward function that simultaneously evaluates the performance of both control loops is critical to solving this problem, because it makes the master DRL PID tuning agent aware of how one loop's performance affects the other. The state vector for the agent will include performance data and past tuning values for both PID controllers. The actions for this master DRL PID tuning agent will be changes to the tuning parameters for both PID controllers. It is contemplated that the presently disclosed subject matter is not limited to using a single or shared DRL PID learning agent to adjust two control loops; rather, two or more related control loops or control loops that interact with and are impacted by other control loops may be adjusted using a common learning agent.

Example: Use of Controllers with a Distillation Tower

Figure 11:
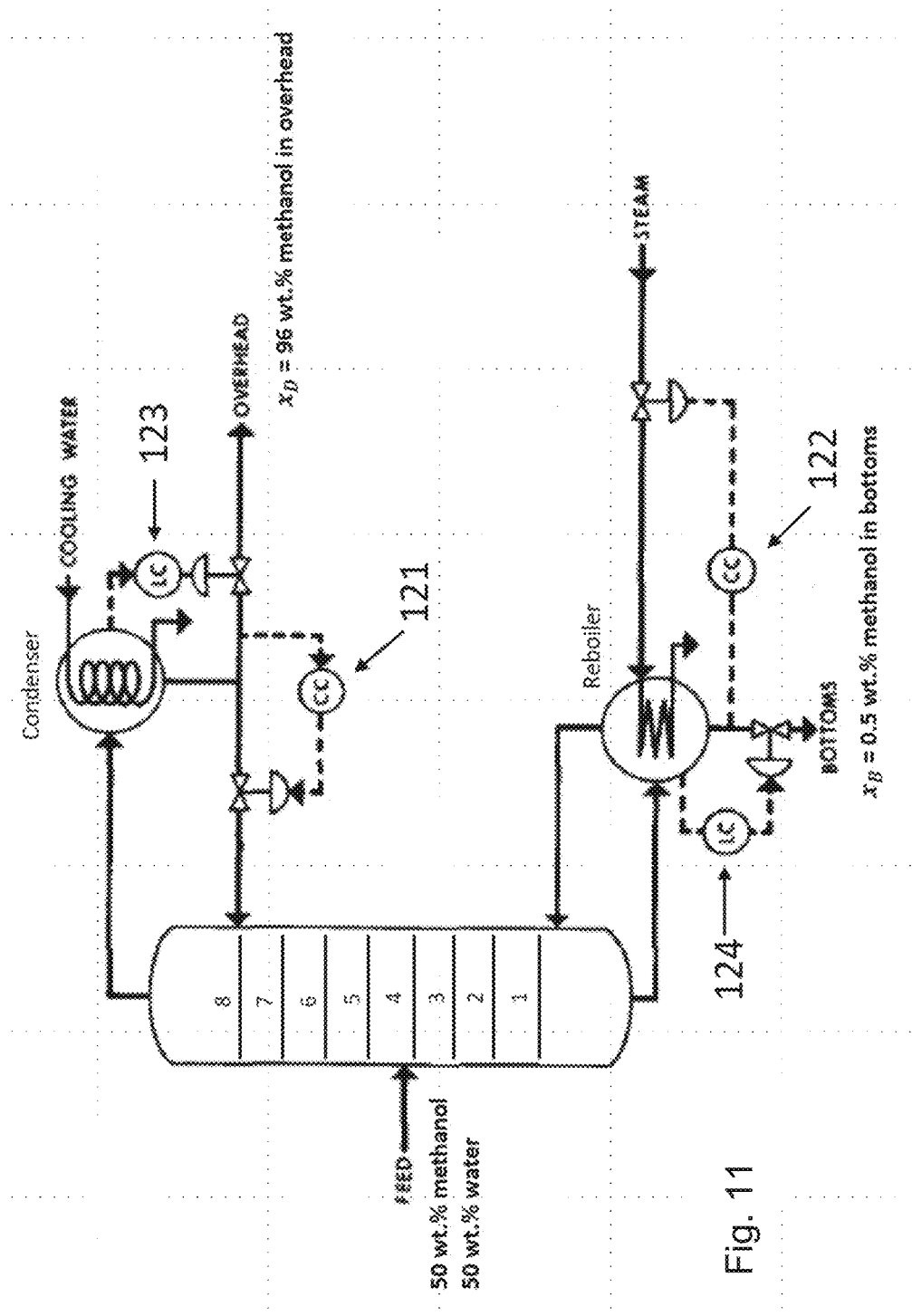
FIG. 11 illustrates the use of four interacting PID controllers with a distillation tower in accordance with the presently disclosed subject matter.

Another example of a system that can benefit from use of a PID controller that is a distillation tower. Distillation is the primary method for separating liquids in chemical plants and refineries. FIG. 11 illustrates a distillation tower illustrating a possible PID controller configuration as suggested by Wood et al., "Terminal Composition Control of a Binary Distillation Column", Chemical Engineering Science, Vol. 28, pp. 1707-1717, (1973). FIG. 11 illustrates a control configuration of four PID controllers designed to reject disturbances in the feed flowrate. Controller 121 adjusts the reflux flowrate to control the top composition, controller 122 adjusts reboiler steam flowrate to control bottoms composition, controller 123 adjusts overhead flowrate to control the fluid level in the condenser, and controller 124 adjusts the bottoms flowrate to control the fluid level in the reboiler. The four PID controllers in this configuration are known to interact quite strongly. As described above in connection with FIG. 3, controller input from one or more detectors can be used by the learning agent 350 to modify the tuning parameters for the PID controllers 121, 122, 123, 124. The controller input from the one or more of detectors may be used by the state analysis module to determine one or more states that are associated with the current value of the controlled variable and/or the value of the controlled variable over a period of time. Based on the state determined by the state analysis module, the learning agent can select an action to perform based on a stored state-action value function. Based on the selected action, the tuning parameters in control module can be modified, such as by making an incremental change in one or more of the tuning parameters.

Another potential controlled variable can correspond to the flowrate of the fluid into a reboiler for the distillation tower. The reboiler for a distillation tower is an example where "tight" control over a controlled variable by a process controller can be desirable. A PID controller including a reinforcement learning agent can be beneficial for controlling this type of variable, as the agent can adapt to the specific nature of the reboiler, as opposed to requiring monitoring by an expert over time to adapt the tuning parameters for the controller to the specific nature of an individual distillation tower.

ADDITIONAL EMBODIMENTS

Embodiment 1

A method for controlling a process using a process controller, comprising: performing a process at conditions comprising a value for a controlled variable having a setpoint, the controlled variable being associated with a process controller comprising a first set of controller tuning parameters; detecting one or more values of the controlled variable relative to the setpoint; determining a first state of the performed process based on the one or more detected values of the controlled variable; performing an action selected based on a comparison of the determined first state with a state-action value function, the performed action corresponding to performing an incremental change in a controller tuning parameter from the first set of controller tuning parameters to form a modified set of controller tuning parameters; detecting one or more additional values of the controlled variable relative to the setpoint after forming the modified set of controller tuning parameters; determining a second state of the performed process based on the detected one or more additional values of the controlled variable; receiving a reward value based on the determined second state; and updating the state-action value function based on the determined first state, the performed action, and the received reward value.

Embodiment 2

The method of Embodiment 1, wherein determining a second state of the performed process is further based on at least one value from the one or more detected values of the controlled variable.

Embodiment 3

The method of any of the above embodiments, wherein the process controller is associated with an actuator for controlling a manipulated variable, the method optionally further comprising modifying the manipulated variable based on the modified set of controller tuning parameters, the one or more additional values being detected after forming the modified set of controller tuning parameters.

Embodiment 4

The method of any of the above embodiments, wherein the first set of controller tuning parameters comprise at least one of a proportional tuning parameter and a gain parameter, and at least one of an integral time parameter and an integral tuning parameter.

Embodiment 5

The method of Embodiment 4, wherein the first set of controller tuning parameters further comprises a derivative time parameter and a derivative tuning parameter.

Embodiment 6

The method of any of the above embodiments, wherein the incremental change comprises multiplying at least one controller tuning parameter by a scaling factor.

Embodiment 7

The method of any of the above embodiments, further comprising updating the state-action value function based on a detected state, a performed action, and a received reward by a second process controller.

Embodiment 8

The method of any of the above embodiments, wherein determining a state comprises determining a state from a plurality of discrete states; or wherein determining a state comprises determining a state from a continuous distribution of states; or a combination thereof.

Embodiment 9

The method of any of the above embodiments, wherein the state-action value function comprises a continuous set of state-action values, or wherein the state-action value function comprises a discrete set of state-action values, or a combination thereof.

Embodiment 10

The method of any of the above embodiments, the method further comprising identifying an action that cannot be performed; and excluding one or more state-action values corresponding to the identified action during selection of the performed action based on the comparison of the determined first state with the state-action value function.

Embodiment 11

The method of any of the above embodiments, wherein the process controller comprises a proportional-integral process controller, or wherein the process controller comprises a proportional-integral-derivative process controller.

Embodiment 12

A process control system including a first process controller, comprising: a detector for detection of a controlled variable; an actuator, electrical activator, second process controller, or combination thereof for modifying a manipulated variable; a first process controller comprising a set of controller tuning parameters, the first process controller being in communication with the detector to receive detected values of the controlled variable and in communication with the actuator, electrical activator, second process controller, or combination thereof to provide a controller output based on the set of controller tuning parameters for control of the manipulated variable, the first process controller further comprising a processor having an associated memory containing executable instructions that, when executed, provide a method for controlling the manipulated variable comprising the method of any of Embodiments 1 to 11.

Embodiment 13

The system of Embodiment 12, wherein the system comprises an actuator for modifying the position of a valve, or wherein the system comprises an electrical activator for modifying the duty cycle of a heater, or a combination thereof.

Embodiment 14

A process controller, comprising: a proportional-integral-derivative controller for receiving detected values of a controlled variable and generating a controller output for control of a manipulated variable based on a set of controller tuning parameters; a state analysis module for determining a state of a process based on one or more detected values of the controlled variable; a state-action value function module for storing a state-action value function and updating the state-action value function based on rewards associated with at least one determined state and at least one performed action; a reinforcement learning agent configured to: receive a determined state, select an action based on the stored plurality of state-action values, and perform an incremental modification of at least one tuning parameter of the set of controller tuning parameters; and a reward module for providing rewards to the state-action value function module.

Embodiment 15

The system of Embodiment 14, wherein the process controller further comprises a setpoint modification module for providing to the proportional-integral control module a setpoint for the controlled variable.

Additional Embodiment A

The method of any of Embodiments 1-11, wherein performing a process comprises performing a chemical production process or petroleum refining process.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for controlling a process using at least one process controller, comprising:
    performing a process in accordance with at least one condition, wherein each of the at least one condition comprising a value for a controlled variable having a setpoint, wherein the controlled variable being associated with a process controller comprising a first set of controller tuning parameters, wherein performing a process comprises performing one of a chemical production process and a petroleum refining process;
    detecting at least one value for each controlled variable relative to the setpoint for each of the at least one condition, wherein detecting at least one value includes using at least one detector to the at least one condition of the process;
    determining, using the at least one process controller, a first state of the performed process based on the at least one detected value for each of the at least one controlled variable;
    performing an action selected, using the at least one process controller, based on a comparison of the determined first state with a state-action value function, the performed action corresponding to performing an incremental change in a controller tuning parameter from the first set of controller tuning parameters to form a modified set of controller tuning parameters;
    detecting at least one additional value for each controlled variable relative to the setpoint after forming the modified set of controller tuning parameters using the at least one detector;
    determining, using the at least one process controller, a second state of the performed process based on the at least one detected additional value for each of the least one controlled variable;
    determining, using the at least one process controller, a received reward value based on the determined second state; and
    updating the state-action value function based on the determined first state, the performed action, and the received reward value.

2. The method of claim 1, wherein determining a second state of the performed process is further based on at least one value from the at least one detected value of the controlled variable.

3. The method of claim 1, wherein the process controller is operatively connected to an actuator for controlling a manipulated variable.

4. The method of claim 3, further comprising modifying the manipulated variable based on the modified set of controller tuning parameters, and detecting the at least one additional value after forming the modified set of controller tuning parameters.

5. The method of claim 1, wherein the first set of controller tuning parameters comprise at least one of a proportional tuning parameter and a gain parameter, and at least one of an integral time parameter and an integral tuning parameter.

6. The method of claim 5, wherein the first set of controller tuning parameters further comprises at least one of a derivative time parameter and a derivative tuning parameter.

7. The method of claim 1, wherein the incremental change comprises multiplying at least one controller tuning parameter by a scaling factor.

8. The method of claim 1, further comprising updating the state-action value function based on a detected state, a performed action, and a received reward using a second process controller.

9. The method of claim 1, wherein determining a state comprises determining a state from one of a plurality of discrete states and a continuous distribution of states.

10. The method of claim 1, wherein the state-action value function comprises at least one of a continuous set of state-action values, and a discrete set of state-action values.

11. The method according to claim 10, wherein the state-action value function comprises a continuous set of state-action values and function approximation is utilized to determine the state-action value function.

12. The method according to claim 11, wherein the function approximation is performed using a deep reinforcement learning network.

13. The method according to claim 12, wherein the deep reinforcement learning network may include at least one network cell containing operatively connected layers.

14. The method according to claim 12, wherein the deep reinforcement learning network comprising:
    at least one shared convolutional layer providing common information related to a predicted value and a predicted action; and
    at least one fully connected layer, wherein each of fully connected layer corresponding to one of the predicted value and the predicted action, wherein each of the at least one shared convolutional layer being operatively connected to each of the at least one fully connected layer.

15. The method of claim 1, the method further comprising identifying an action that cannot be performed; and excluding one or more state-action values corresponding to the identified action during selection of the performed action based on the comparison of the determined first state with the state-action value function.

16. The method of claim 1, wherein the process controller comprises at least one of at least one proportional-integral process controller and at least one proportional-integral-derivative process controller.

17. The method of claim 16, wherein the process controller comprises at least two proportional-integral-derivative controllers, wherein a master reinforcement learning agent coordinates learnings from each of the at least two proportional-integral-derivative controllers.

18. The method of claim 17, wherein one of the at least two proportional-integral-derivative controllers controls one process control loop and a second of the at least two proportional-integral-derivative controllers controls another process control loop, wherein the master reinforcement learning agent coordinates learnings from each of the at least two proportional-integral-derivative controllers.

19. The method according to claim 1, wherein the performed action corresponding to performing the incremental change includes utilizing a reference value to adjust a tuning speed.

20. A process control system for controlling a process, comprising:
a first process controller for controlling the operation of the process;
a detector for detection of at least one a controlled variable associated with the operation of the process;
at least one of an actuator, electrical activator, and second process controller for modifying a manipulated variable;
wherein the first process controller comprising a set of controller tuning parameters, the first process controller being in communication with the detector to receive detected values of the at least one controlled variable and in communication with at least one of an actuator, electrical activator, and second process controller to provide a controller output based on the set of controller tuning parameters for control of the manipulated variable, the first process controller further comprising a processor having an associated memory containing executable instructions that, when executed, provide a method for controlling the manipulated variable comprising:
detecting at least one value for each controlled variable relative to the setpoint for each of the at least one condition, wherein detecting at least one value includes using the detector to the at least one condition of the process;
determining a first state of the performed process based on the at least one or more detected value for each of the at least one values of the controlled variable;
performing an action selected based on a comparison of the determined first state with a state-action value function, the performed action corresponding to performing an incremental change in a controller tuning parameter from the first set of controller tuning parameters to form a modified set of controller tuning parameters;
detecting at least one additional value for each of the controlled variable relative to the setpoint after forming the modified set of controller tuning parameters using the at least one detector;
determining a second state of the performed process based on the at least one detected one or more additional value for each of the least one values of the controlled variable;
determining a received reward value based on the determined second state; and
updating the state-action value function based on the determined first state, the performed action, and the received reward value
determining a first state of the performed process based on the one or more detected values of the controlled variable;
determining a second state of the performed process based on the detected one or more additional values of the controlled variable;
determining a received reward value based on the determined second state; and
updating the stored state-action value function based on the determined first state, the performed action, and the received reward value.

21. The system of claim 20, wherein the first process controller comprises one of a proportional-integral process controller, and a proportional-integral-derivative process controller.

22. The system of claim 20, wherein the system comprises at least one of an actuator for modifying the position of a valve, and an electrical activator for modifying the duty cycle of a heater.

23. The system of claim 20, wherein the state-action value function comprises at least one of a continuous set of state-action values, and a discrete set of state-action values.

24. The system of claim 23, wherein the state-action value function comprises a continuous set of state-action values and function approximation is utilized to determine the state-action value function.

25. The system of claim 24, wherein the function approximation is performed using a deep reinforcement learning network.

26. The system of claim 25, wherein the deep reinforcement learning network comprising:
at least one shared convolutional layer providing common information related to a predicted value and a predicted action;
at least one fully connected layer, wherein each of fully connected layer corresponding to one of the predicted value and the predicted action, wherein each of the at least one shared convolutional layer being operatively connected to each of the at least one fully connected layer.

27. The system of claim 20, wherein the set of controller tuning parameters comprise at least one of a proportional tuning parameter and a gain parameter, and at least one of an integral time parameter and an integral tuning parameter.

28. The system of claim 20, further comprising:
a second process controller, and
a master reinforcement learning agent for coordinating learnings from the first process controller and the second process controller.

29. The system according to claim 20, wherein the process controller, comprising:
at least one proportional-integral-derivative controller for receiving detected values of a controlled variable and generating a controller output for control of a manipulated variable based on a set of controller tuning parameters;
a state analysis module for determining a state of a process based on one or more detected values of the controlled variable;

a state-action value function module for storing a state-action value function and updating the state-action value function based on rewards associated with at least one determined state and at least one performed action;
a reinforcement learning agent configured to:
receive a determined state,
select an action based on the stored plurality of state-action values, and
perform an incremental modification of at least one tuning parameter of the set of controller tuning parameters; and
a reward module for providing rewards to the state-action value function module.

30. The system according to claim 29, wherein the process controller further comprises a setpoint modification module for providing to the proportional-integral control module a setpoint for the controlled variable.

31. The system according to claim 29, further comprising a master reinforcement learning agent to coordinate learnings from each of the at least one proportional-integral-derivative controllers.

32. The system according to claim 31, wherein the at least one proportional-integral-derivative controller includes at least two proportional-integral-derivative controllers, wherein one of the at least two proportional-integral-derivative controllers controls one process control loop and a second of the at least two proportional-integral-derivative controllers controls another process control loop, wherein the master reinforcement learning agent coordinates learnings from each of the at least two proportional-integral-derivative controllers.

* * * * *